US011669375B2

(12) United States Patent
Marudhachalam et al.

(10) Patent No.: US 11,669,375 B2
(45) Date of Patent: Jun. 6, 2023

(54) DYNAMIC LOAD-BALANCE OF MULTI-CHANNEL REQUESTS

(71) Applicant: Freshworks Inc., San Mateo, CA (US)

(72) Inventors: Karthikeyan Marudhachalam, Chennai (IN); Rohit Agarwal, Chennai (IN); Hariharan Ganapathiraman, Chennai (IN); Abinaya K. Sarathi, Chennai (IN)

(73) Assignee: Freshworks Inc., San Mateo, CA (US)

( * ) Notice: Subject to any disclaimer, the term of this patent is extended or adjusted under 35 U.S.C. 154(b) by 272 days.

(21) Appl. No.: 16/795,944

(22) Filed: Feb. 20, 2020

(65) Prior Publication Data

US 2020/0233725 A1 Jul. 23, 2020

(51) Int. Cl.

| | |
|---|---|
| ***G06F 9/50*** | (2006.01) |
| ***H04L 41/0896*** | (2022.01) |
| ***H04L 41/16*** | (2022.01) |
| ***H04L 41/046*** | (2022.01) |

(52) U.S. Cl.

CPC .......... *G06F 9/5083* (2013.01); *G06F 9/5072* (2013.01); *H04L 41/046* (2013.01); *H04L 41/0896* (2013.01); *H04L 41/16* (2013.01)

(58) Field of Classification Search

CPC ... G06F 9/5083; G06F 9/5072; H04L 41/046; H04L 41/0896; H04L 41/16; H04L 41/5022; H04L 41/147; H04L 43/0876; G06Q 10/063112

See application file for complete search history.

(56) References Cited

U.S. PATENT DOCUMENTS

| | | | | |
|---|---|---|---|---|
| 2015/0201078 A1* | 7/2015 | Khouri | ................ | H04M 3/5232 379/265.12 |
| 2017/0346948 A1* | 11/2017 | Wolf | ................... | H04M 3/5238 |
| 2019/0158671 A1* | 5/2019 | Feast | .................. | G06Q 10/0633 |

* cited by examiner

*Primary Examiner* — Sisley N Kim
(74) *Attorney, Agent, or Firm* — LeonardPatel PC; Sheetal S. Patel; Michael A. Leonard, II

(57) ABSTRACT

A multi-tenant load balancing system that includes artificial intelligence based algorithm to dynamically route requests from one or more channels to an agent best suited to process the request. The AI based algorithm routes the request based on company's business goals, agent attributes, and channel attributes. The AI based algorithm also predicts agent availability.

19 Claims, 2 Drawing Sheets

Start

100

102 Receive a Request from an End User

104 Extract One or More Attributes from the Request

106 Store Extracted One or More Attributes and Request

108 Assign the Request to Most Appropriate Agent

End

Start
102
Receive a Request from an End User
104
Extract One or More Attributes from the Request
106
Store Extracted One or More Attributes and Request
108
Assign the Request to Most Appropriate Agent
End

100

DYNAMIC LOAD-BALANCE OF MULTI-CHANNEL REQUESTS

CROSS-REFERENCE TO RELATED APPLICATION

This application claims the benefit of, and priority to, Indian Provisional Patent Application Serial No. 201941006613, filed on Jan. 20, 2019. The subject matter thereof is hereby incorporated herein by reference in its entirety.

FIELD

The present invention relates to dynamic load balancing of multi-channel request routing to agents.

BACKGROUND

When a business receives requests from various channels (whether real-time or asynchronous), a full-time supervisor generally manages the request. By managing, the full-time supervisor routes the request to the appropriate agent.

Some businesses, however, use routing algorithms to meet their routing needs. Conventional routing algorithms typically require the supervisor to statically configure the list of agents available in each channel, including the agent's maximum allowed load on each channel. When a request comes in, the algorithm blindly assigns the request to the agent with least load. When there is a spike in requests received from a particular channel, the supervisor reallocates the agents across channels accordingly. This requires continuous monitoring and planning. Moreover, when agents with a particular skill are in demand, the algorithm continues to assign generic requests to the agents with the particular skill increasing the wait time for processing the special requests.

Thus, an alternative load-balancing approach is more beneficial.

SUMMARY

Certain embodiments of the present invention may provide solutions to the problems and needs in the art that have not yet been fully identified, appreciated, or solved by current routing algorithms. For example, some embodiments generally pertain to dynamically load balance one or more requests in real-time.

In one embodiment, a process may include receiving a request from an end user via one of a plurality of communication channels. The process may also include routing the received request to an agent best equipped to handle the received request. The routing of the received request includes determining the best equipped agent based one or more business goals, one or more agent attributes, and one or more communication channel attributes.

In another embodiment, an apparatus includes one or more processors and memory comprising a set of instructions. The set of instructions are configured to cause the one or more processors to receive a request from an end user device via one of a plurality of communication channels, and route the received request to an agent best equipped to handle the received request. The set of instructions are further configured to cause the one or more processors to determine the best equipped agents based on one or more business goals, one or more agent attributes, and one or more communication channel attributes.

In yet another embodiment, a load balancing system includes a load balancing server interfaced with a user device. The load balancing server is configured to receive a request from the user device via one of a plurality of communication channels. The load balancing server includes an enricher service module configured to extract raw data from the request to help identify one or more agents best equipped to handle the request. The load balancing server also includes a task assigner module configured to assign the request to an agent best equipped to handle the request.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments provide a scalable solution for businesses to dynamically route incoming requests on multiple communication channels to the least-loaded agent with the most appropriate skill in a multi-tenant environment. This scalable solution enables faster resolution of customer requests. Every omni-channel agent is assigned tasks by matching parameters of skills, channel favorability, current load, stickiness, service level agreements and certain others to create an agent-channel-task affinity score, which predicts optimal routing. In some embodiments, the parameters are custom for each business, but can be monitored with the in-built machine learning algorithm to optimize for certain outcomes. Outcomes may include fastest reply, fastest resolution, most accurate resolution, least replies to resolution. Additionally, some embodiments combine traditional load balancing and skill-based routing algorithms with a new approach to achieve faster and more accurate routing configurations. These routing configurations are managed by the system (e.g., an artificial intelligent (AI) algorithm) reducing or eliminating the need for human intervention after the system is setup.

An end-customer may reach out to an agent through a variety of communication channels. These communication channels include real-time channels or asynchronous channels. Real-time channels may include messaging applications embodied on a mobile device, live chats running on a webpage, and phone calls, for example. Asynchronous channels may include email communication, self-service, social media applications, and contact forms on a webpage.

Some embodiments pertain to a multi-tenant dynamical load balance architecture configured to support businesses, allowing these businesses to service their customers across various channels. In an embodiment, attributes from an incoming request and attributes associated with agents are considered by an artificial intelligent (AI) module. This enables a business to reduce response time. For example, the AI module may change the configuration in real-time, such that response times by the agent remains low.

Figure 1:
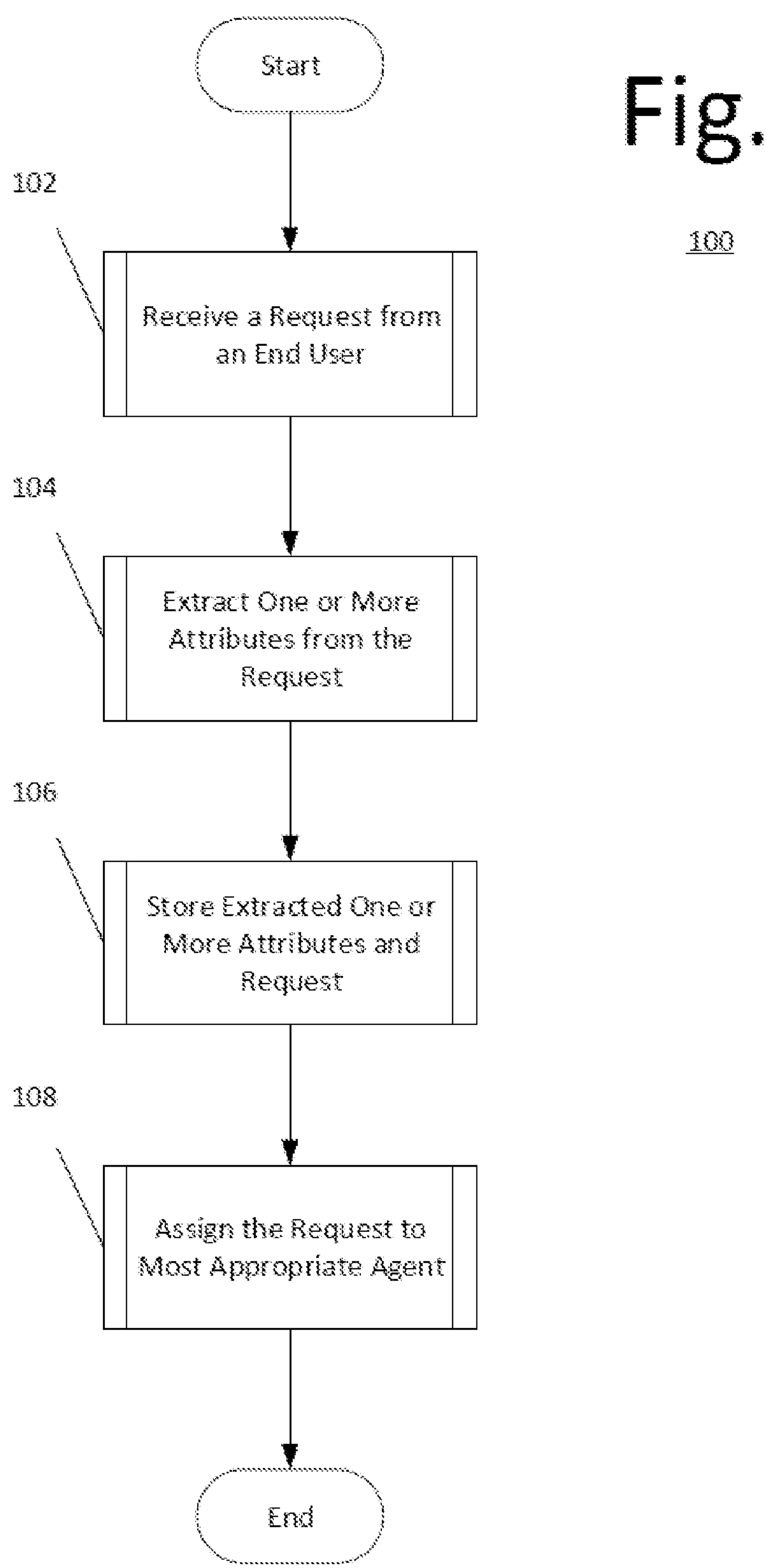
FIG. 1 is a flow diagram illustrating a process for dynamic load balancing of requests, according to an embodiment of the present invention

FIG. 1 is a flow diagram illustrating a process 100 for dynamic load balancing of requests, according to an embodiment of the present invention. In this embodiment, process 100 may begin at 102 with a queuing module receiving a request from an end user (e.g., a customer) operating a user device. The request may be received via one of the variety communication channels discussed above.

At 104, an enricher service module is configured to extract, from the request, one or more attributes. These attributes may include agent skills required to process the request and, in some embodiments, the agent best suited to handle the request. Attributes may also include SLA based on the end user and priority, group/department concerned, average time taken to resolve this type of requests, agents who handled previous requests from the same end user, etc.

In some embodiments, skills required for handling the requests may be found either by a set of static rules and/or by feature extraction from the text content of the request by the artificial intelligence (AI) algorithm. Based on the end user segment and corresponding SLA configuration for the given priority of the request, the request deadline may be calculated. The parameters, such as group/department concerned and average resolution time, are determined by the AI algorithm based on similar tickets received in the past. Agents that have handled previous requests from the same end user may also be considered with respect to historical requests data.

At 106, a queue adds (or stores) the request, including the one or more extracted attributes. At 108, a routing engine (or module) is configured to analyze the one or more extracted attributes associated with the request, and assign the request to the appropriate agent. For example, the routing engine is configured to assign the request to the appropriate agent based on one or more parameters, which will be discussed in more detail below.

Let's say, for example, that there are two agents. One is currently available, and the second agent is currently assisting another end user. If the second agent is more equipped to handle the request, the routing engine will wait until the second agent completes his or her task prior to assigning the request to the second agent. In this manner, the routing engine does not assign the request based on availability. Instead, the routing engine assigns the request based on the business goals, agent's attributes, and channel attributes. This way, in a further embodiment, the routing engine is configured to remove the request from the queue and assign the request to the agent upon the agent's completion of the ongoing request.

In another embodiment, the routing engine may include AI capability. For example, the routing engine may calculate resolution time of an ongoing request and predict availability of the agent based on the resolution time. In one embodiment, the routing engine analyzes the historical data with respect to previously resolved requests and agent completion time when calculating the resolution time. By predicting agent availability, the routing engine keeps the request within the queue (e.g., a task wait queue database) until the best equipped agent becomes available. This way, less competent agents are not assigned a request that he or she is not capable of handling.

Figure 2:
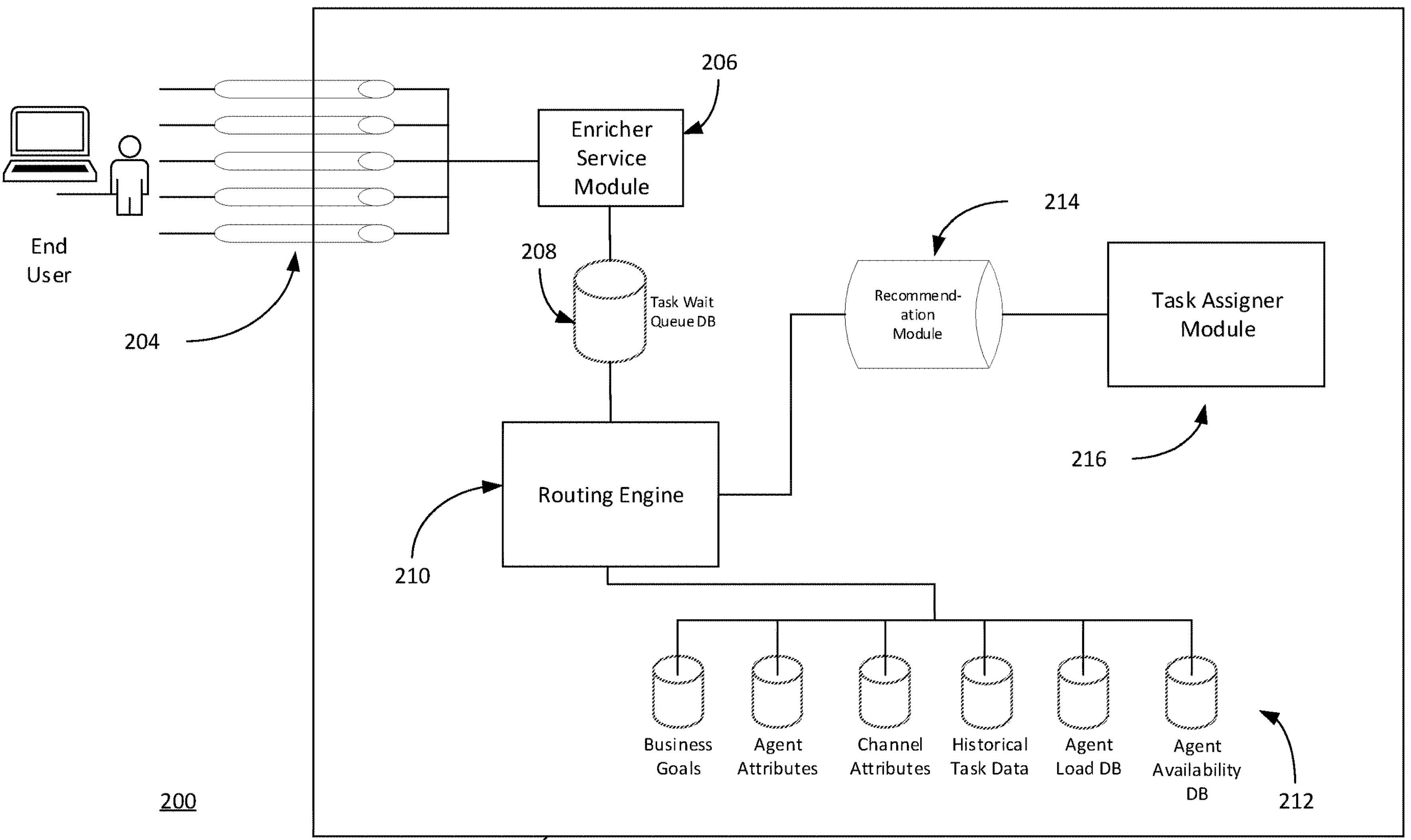
FIG. 2 is a block diagram illustrating a load-balancing system configured to dynamically balance the load of an incoming request, according to an embodiment of the present invention.

FIG. 2 is a block diagram illustrating a load-balancing system 200 configured to dynamically balance the load of an incoming request, according to an embodiment of the present invention. In this embodiment, load-balancing system 200 includes a load balancing server 202 interfacing with an end user. In an embodiment, load balancing server 202 receives a request from the end user via one of communication channels 204. Communication channels 204 may include a chat channel, an email channel, an phone channel, a social networking channel, and a messaging channel, for example. For example, when the end user submits the request through communication channel 204, enricher service module 206 is configured to receive the request. The request may include raw data such as subject, description, email address and a set of additional properties for a support ticket via email. The raw data may also include the message sent by the end user for social media/chat/messaging requests, phone number and IVR options selected for the phone call. Because the request includes raw data, enricher service module 206 is configured to extract the raw data from the request.

From this raw data, enricher service module 206 may also identify the types of agents most equipped to handle the request. Enricher service module 206 may identify the types of agents based on the skills required for handling the request and the agents who have handled the end user's requests in the past. This may help determine the most preferred list of agents in some embodiments.

A task wait queue (hereinafter "queue") 208, which is embodied within a database in some embodiments, is connected to enricher service module 206 and stores the request and the enriched data extracted from the request.

Queue 208 is also connected to a routing engine 210. In some embodiments, routing engine 210 includes a core AI algorithm, which receives one or more inputs signals from one or more datastores 212. One or more datastores 212 may include business goals, agent attributes, channel attributes, historical task/request data, agent load, and agent availability, to name a few.

Administrator of the business may select one or more of the desired business goals out of fastest reply, fastest resolution, most accurate resolution, least replies to resolution, maximum agent utilization, etc. He or she may also configure the channel attributes, such as the priority for requests from each channel, the requests affect each other (e.g., an agent on a phone call shouldn't be assigned any chat or email ticket), etc. Number of active requests that are assigned to each agent are stored in an agent load datastore. Agent available datastore is configured to store which channel the agent prefers to receive requests from and also whether he or she is connected to the corresponding system for receiving the requests. A data lake may include historical requests data is used to find the agents that handled requests from an end user and also for building AI models.

With the above input signals received by routing engine 210, a heuristic algorithm for routing is developed. At the same time, the requests stored within queue 208 are continuously prioritized by routing engine 210. For example, routing engine 210 compares the business goals with the extracted (enriched) raw data from the request and determines the most equipped agent to process the request.

In some embodiments, the algorithm may use one or more of metrics while routing the request. These metrics may include time taken by the agent for first response of similar requests, time taken by the agent for resolving of similar requests, customer satisfaction (CSAT) rating received by agent of similar requests, and the average number of replies required for resolving of similar requests. Another metric may include the number and type of requests each agent has been assigned to, which can be used to predict when the agent will become available for handling more requests.

In some embodiments, an administrator of the business may initially configure the business goals for the routing engine. These goals may be based on one or more of fastest reply, fastest resolution, most accurate resolution, least replies to resolution, maximum agent utilization, etc. The routing engine may select the appropriate AI based algorithm to achieve the desired business goals.

Characteristics of the algorithm for each business goal may include fastest resolution, most accurate resolution, least replies to resolution, maximum agent utilization, fastest reply, to name a few. Fastest resolution may be achieved by selected the agent with the best history of resolving similar kind of requests the quickest. Most accurate resolution may be achieved by selected the agent, who received the best CSAT in the past for similar kind of requests. Least replies to resolution may be achieved by selected the agent, who was able to resolve similar requests in the past with minimal iterations. Maximum agent utilization may be achieved by the algorithm that predicts the kind of requests expected based on the past trends, that will map that against the number of agents available for each skill. Based on this data, the AI algorithm may reserve a few agents for skills that are in demand. This demand is continuously updated based on time of the day/week, sudden spike noticed, etc. Fastest reply may be achieved by selecting the agents with best history of sending very quick first response.

In all the above cases, the AI algorithm considers typical time taken to resolve requests and the number of different type of requests received in optimizing what kind of requests to send to which agent. This allows the AI algorithm to hold a request in queue 208 until the best agent is becomes available even though less qualified agents are available.

Routing engine may improve efficiency by selecting the agents with skills required by tasks, channel favorability, current load of agents, stickiness, service level agreements and certain other parameters.

A (task assignment) recommendation module 214, which is connected to routing engine 210, may assign or recommend which agent should be assigned the request. Task assigner module 216 may assign the request to the appropriate agent.

Some embodiments utilize an AI algorithm to allow a business to increase CSAT while decreasing resolution times. The AI algorithm ensures quick and accurate request distribution. Since the AI algorithm continuously learns about the request and agent attributes, the AI algorithm may direct the incoming requests to the most appropriate agents. Over time, this AI algorithm improves request distribution.

The system architecture is setup for one to infinite businesses to be hosted on a single machine cluster, while still being able to maintain separate routing conditions for different businesses. Businesses can seamlessly attach more channels during runtime and still benefit from the load balancing.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented process, comprising:

performing, by an enricher service module, receiving a request from an end user device via one of a plurality of communication channels, and identifying one or more types of agents most equipped to handle the request based on one or more skills required for handling the agents, and identifying one or more agents who have handled a previous request from the end user device to determine a preferred list of agents to handle the request;

performing, by a task wait queue embodied in a database, storing the request from the end user device and the preferred list of agents to handle the request;

performing, by a routing engine, continuously prioritizing, using an artificial intelligence (AI) algorithm, the requests stored within the task wait queue to determine an agent best equipped to handle the request, wherein the AR algorithm continuously learns the request and the one or more attributes, thereby improving request distribution over time;

performing, by a task assignment recommendation module, recommending the agent best equipped to handle the request; and performing, by a task assigner module, assigning the agent best equipped to handle the request, wherein the queue is interfaced between the enricher service module and a routing engine, and is configured to store the request and the raw data extracted from the request, the recommendation module is interfaced between the routing engine and a task assigner module, and is configured to assign or recommend which agent from the one or more identified agents should be assigned the request.

2. The computer-implemented process of claim 1, further comprising:

extracting, from the request, the one or more attributes, wherein the one or more attributes comprises one or more agent skills required to process the request.

3. The computer-implemented process of claim 2, wherein the one or more agent skills are defined by a set of static rules or extracted from text content of the request.

4. The computer-implemented process of claim 2, further comprising:

storing the request and the one or more extracted attributes associated with the request in a task wait queue.

5. The computer-implemented process of claim 4, further comprising:

analyzing the one or more stored extracted attributes associated with the request in order to assign the request to the agent best equipped to handle the request.

6. The computer-implemented process of claim 5, further comprising:

calculating a resolution time of an ongoing request to predict availability of the agent best equipped to handle the request based on the resolution time.

7. The computer-implemented process of claim 6, wherein the calculating of the resolution time further comprises analyzing historical data of previously resolved requests and an agent completion time of the agent best equipped to handle the request.

8. A load balancing system, comprising:

a load balancing server interfaced with a user device, configured to receive a request from the user device via one of a plurality of communication channels and assign an agent best equipped to handle the request, wherein the load balancing server comprising an enricher service module, a task wait queue within a database, a routing engine, a recommendation module, and a task assigner module, wherein the enricher service module is configured to extract raw data from the request to determine a preferred list of agents to handle the request;

the task wait queue is configured to store the request from the end user device and the preferred list of agents to handle the request;

the routing engine is configured to continuously prioritize, using an artificial intelligence (AI) model, the requests stored within the task wait queue to determine an agent best equipped to handle the request, wherein the AR algorithm continuously learns the request and the one or more attributes, thereby improving request distribution over time;

the task assignment recommendation module is configured to recommend the agent best equipped to handle the request; and the task assigner module is configured to assign the agent best equipped to handle the request, wherein the queue is interfaced between the enricher service module and a routing engine, and is configured to store the request and the raw data extracted from the request, the recommendation module is interfaced between the routing engine and a task assigner module, and is configured to assign or recommend which agent from the one or more identified agents should be assigned the request.

9. An apparatus, comprising:

one or more processors; and memory comprising a set of instructions, wherein the set of instructions are configured to cause the one or more processors to execute an enricher service module configured to perform receiving a request from an end user device via one of a plurality of communication channels, and identifying one or more types of agents most equipped to handle the request based on one or more skills required for handling the agents and identifying one or more agents who have handled a previous request from the end user device to determine a preferred list of agents to handle the request;

a task wait queue embodied in a database configured to perform continuously prioritizing, using an artificial intelligence (AI) algorithm, the requests stored within the task wait queue to determine an agent best equipped to handle the request, wherein the AR algorithm continuously learns the request and the one or more attributes, thereby improving request distribution over time;

a task assignment recommendation module configured to perform recommending the agent best equipped to handle the request; and a task assigner module configured to perform assigning the agent best equipped to handle the request, wherein the queue is interfaced between the enricher service module and a routing engine, and is configured to store the request and the raw data extracted from the request, the recommendation module is interfaced between the routing engine and a task assigner module, and is configured to assign or recommend which agent from the one or more identified agents should be assigned the request.

10. The apparatus of claim 9, wherein the set of instructions are further configured to cause the one or more processors to execute:

extracting, from the request, the one or more attributes, and the one or more attributes comprises one or more agent skills required to process the request.

11. The computer-implemented process of claim 10, wherein the one or more agent skills are defined by a set of static rules or extracted from text content of the request.

12. The computer-implemented process of claim 10, wherein the set of instructions are further configured to cause the one or more processors to execute:

storing the request and the one or more extracted attributes associated with the request in the task wait queue.

13. The computer-implemented process of claim 12, wherein the set of instructions are further configured to cause the one or more processors to execute:

analyzing the one or more stored extracted attributes associated with the request in order to assign the request to the agent best equipped to handle the request.

14. The computer-implemented process of claim 12, wherein the set of instructions are further configured to cause the one or more processors to execute:

calculating a resolution time of an ongoing request to predict availability of the agent best equipped to handle the request based on the resolution time.

15. The computer-implemented process of claim 14, wherein the set of instructions are further configured to cause the one or more processors to execute:

analyzing historical data of previously resolved requests and an agent completion time of the agent best equipped to handle the request.

16. The load balancing system of claim 8, wherein the routing engine comprises a core artificial intelligence algorithm and is connected to one or more input signals from one or more datastores, wherein the one or more datastores comprises a datastore for business goals, a datastore for agent attributes, a datastore for channel attributes, a datastore for historical task/request data, a datastore for agent load, and a datastore for agent availability wherein the routing engine is configured to continuously prioritize the request and one or more additional requests within the queue until the request is assigned to the agent best equipped to handle the request, wherein the routing engine compares data received via the one or more input signals with the extracted raw data from the request to identify the one or more agents best equipped to handle the request.

17. The load balancing system of claim 8, wherein the plurality of communication channels comprises a chat channel, an email channel, a phone channel, a social networking channel, and a messaging channel.

18. The load balancing system of claim 8, wherein the raw data comprises of subject, description, email address, a set of additional properties for a support ticket, a message sent by the user device for social media/chat/messaging requests, a phone number and IVR options selected for a phone call, or any combination thereof.

19. The load balancing system of claim 8, wherein the enricher service module is further configured to identify the one or more agents best equipped to handle the request based on one or more skills required for handling the request and one or more agents who have previously handled one or more requests from the user device.

* * * * *

UNITED STATES PATENT AND TRADEMARK OFFICE

CERTIFICATE OF CORRECTION

PATENT NO. : 11,669,375 B2
APPLICATION NO. : 16/795944
DATED : June 6, 2023
INVENTOR(S) : Karthikeyan Marudhachalam et al.

It is certified that error appears in the above-identified patent and that said Letters Patent is hereby corrected as shown below:

In the Specification

Column 1, Lines 4-11 should read:
CROSS-REFERENCE TO RELATED APPLICATION
This application claims the benefit of, and priority to, Indian Provisional Patent Application Serial No. 201941006613, filed on Feb. 20, 2019. The subject matter thereof is hereby incorporated herein by reference in its entirety.

Signed and Sealed this
Sixteenth Day of January, 2024

Katherine Kelly Vidal

Katherine Kelly Vidal
*Director of the United States Patent and Trademark Office*